Nov. 14, 1944.　　　E. J. CIABATTARI　　　2,362,802
CONTROL OF DUPLEX PNEUMATIC SEWAGE EJECTORS
Filed April 16, 1943
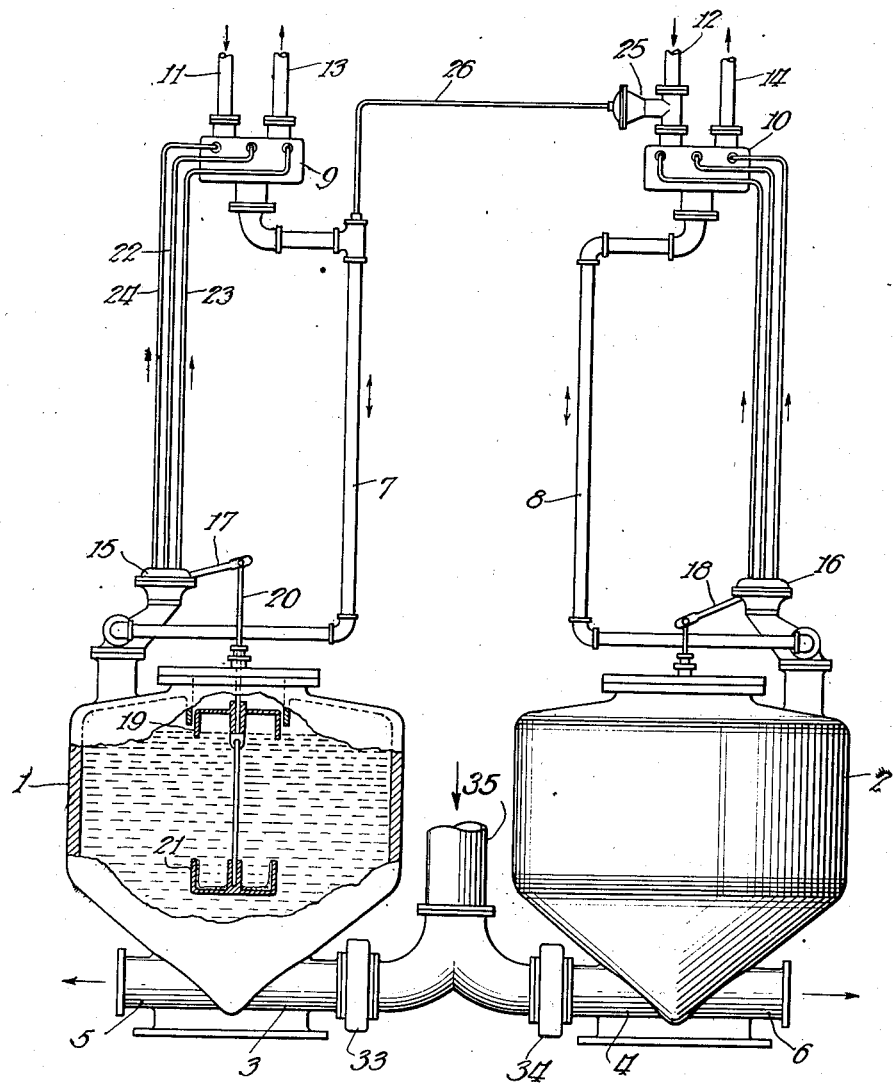
Inventor
Emil J. Ciabattari
By Soans Pond & Anderson Attys.

Patented Nov. 14, 1944

2,362,802

UNITED STATES PATENT OFFICE 2,362,802

CONTROL OF DUPLEX PNEUMATIC SEWAGE EJECTORS

Emil J. Ciabattari, Chicago, Ill., assignor to Yeomans Brothers Company, a corporation of Delaware Application April 16, 1943, Serial No. 483,272

3 Claims. (Cl. 103—246)

This invention relates to the control of the discharging operation of an installation comprising two or duplex pneumatic sewage receivers or so-called ejectors.

The main object of the invention is to provide an arrangement to prevent simultaneous discharge or ejection of sewage from both of the receivers, and especially to provide a pneumatically controlled arrangement for this purpose.

It is more or less common practice in large buildings and in industrial plants and in municipal sewage systems to provide two substantially like sewage receiving receptacles connected so as to be capable of simultaneously receiving sewage from a common source. Each of the receivers is preferably provided with an independent outlet connection to a high level sewer pipe which conducts the sewage to a main sewer pipe or to settling tanks in a treatment plant. Duplex units are employed in preference to a single unit having a capacity equal to the total capacity of the duplex units for the reason that the use of duplex units permits operation to discharge a smaller volume of sewage at a more nearly constant rate than is possible where a single large capacity receiver is employed and which must be intermittently emptied, usually by a high volume discharge flow. Considerations of internal friction in the outlet piping and also, in the case of discharging of sewage into settling tanks, consideration of agitation make the duplex unit arrangement advisable. Other reasons also exit for preferring a duplex arrangement to a single large capacity arrangement.

In the case of duplex pneumatic ejectors, in which an air compressor motor is started and stopped directly from electrodes in the respective receivers, simultaneous discharge of the two receivers has been effectively accomplished by employing an electrical interlock between the motor starting equipment so that when one motor is running, the other cannot start. This arrangement is not, however, adaptable to the control of duplex units which receive their compressed air supply from a compressed air storage tank or other air supply system in which the compressor motors may not be started and stopped.

As indicated, the present invention has to do particularly with the control of duplex pneumatic sewage ejectors in which compressed air is supplied from a storage tank or similar source of stored compressed air.

It is a further object of the invention to provide efficient, simple, durable and reliable mechanism for preventing the simultaneous discharge of duplex sewage ejectors, and which mechanism is especially adapted, although not necessarily restricted, to employment in connection with systems in which the compressed air supply is derived from a stored compressed air source.

Other objects and advantages of the invention will be understood by reference to the following specification and accompanying drawing, wherein there is more or less diagrammatically illustrated in the single figure, a selected embodiment of the invention.

In the drawing, a pair of sewage receivers 1 and 2 are represented as having their inlet conduits 3 and 4 respectively connected to a common conduit 35. In the diagrammatic illustration, the connection to the conduit or pipe 35 is illustrated in such a location that there will be a tendency for the sewage to flow equally to the two receivers. This, however, is not essential, although it is advantageous in instances where approximate alternate operation or discharge of the receivers is desired. The receivers 1 and 2 have outlet conduits 5 and 6 respectively which, it will be understood, are usually connected to a common discharge or so-called force pipe which ordinarily carries the sewage to a higher level and to a main sewer or to a settling tank.

The receivers 1 and 2 are connected by means of conduits 7 and 8 respectively, through three-way valves 9 and 10, to conduits 11 and 12, which are in turn connected to a source of compressed air. The three-way valves 9 and 10 also have connections 13 and 14 respectively to the atmosphere.

The valves 9 and 10 are preferably in the form of piston valves which may be pneumatically adjusted so that in one position of the piston, the conduits 7 and 8 are connected to the compressed air supply through the conduits 11 and 12. In the other position of the pistons of the valves, the conduits 7 and 8 are connected to the relief or exhaust connections 13 and 14. It will be understood, of course, that the three-way valves 9 and 10 are such that there is no direct connection between the air inlet pipes 11 and 12 and the respective exhaust pipes 13 and 14. Also it will be apparent that when the valves 9 and 10 are adjusted to connect the conduits 7 and 8 with the respective air inlet conduits 11 and 12, compressed air will be delivered to the respective receivers and will act as a piston on the surface of the sewage in the receivers to thereby discharge the same through their respective outlets 5 and 6. Backward flow of sewage in the conduit 35 is prevented by means of suitable check valves provided in the inlet conduits 3 and 4 as indicated at 33 and 34.

The position of the pistons in the valves 9 and 10 may be controlled by means of three-way valves 15 and 16 respectively associated with the receivers 1 and 2. The valves 15 and 16 may be of any suitable construction, usually embodying a movable element which is adapted to be moved between two operative positions incident to the rocking of arms 17 and 18, which are respectively connected to float or like means within the receivers. One suitable float means may consist of an upper bell 19 secured to a rod 20 which is mounted for sliding movement through the cover of the sewage receiver, suitable means being provided for preventing leakage of air out of the receiver through the passageway for the rod 20. Another and downwardly located bell 21 in inverted position is connected to the upper bell 19. The lower bell 21 constitutes a receptacle which is normally filled with sewage so that the combined weight of the bell structure and the sewage in the lower bell is operative to move the rod 20 and arm 17 downwardly when the level of sewage in the receiver 1 is lowered to a sufficient extent. When the level of sewage in the receiver rises, it ultimately reaches the upper bell 19 and traps air therein. The buoyancy of the bell structure thus produced is sufficient, when the level of sewage reaches a predetermined height, to move the rod 20 and arm 17 upwardly to accordingly shift the movable element of the valve 15 (or 16).

When the level of sewage in the receiver 1 is at a predetermined height, substantially as represented in the receiver 1, the valve 15 will be so adjusted as to cause compressed air to flow through a bleeder connection 22 from the piston valve 9 through the valve 15 and upwardly through a conduit 23 to one end of the piston valve so as to shift the piston therein to open the connection between the air inlet 11 and the conduit 7. Compressed air then flows downwardly through the conduit 7 and into the receiver to thereby effect discharge of the receiver 1.

When the discharging operation is completed, the valve 15 is adjusted as above described to cause compressed air to flow through the bleeder 22, through the valve 15 and upwardly through the conduit 24 to the other end of the piston valve 9 so as to effect shifting of the piston to close the connection between the air inlet 11 and conduit 7 and to establish a relief connection between the outlet or exhaust 13 and said conduit 7. Sewage may then flow into the receiver 1, the air being displaced from the receiver through the conduit 7, valve 9 and exhaust 13.

The operation of the receiver No. 2 is substantially identical with that above described in respect of receiver 1.

In the absence of some means for preventing simultaneous discharge of the receivers, such discharge could occur. For reasons already indicated, it is preferable that such simultaneous discharge be prevented. For this purpose there is provided means for closing a valve in the air inlet conduit 11 or 12, controlled by the presence of air pressure in the conduit of the other receiver.

In this instance a diaphragm valve 25 is illustrated in the air inlet pipe 12 of the receiver 2. Said diaphragm valve has a conduit 26 connecting the chamber on one side of the diaphragm with the conduit 7 of the other receiver. The diaphragm valve 25 is of more or less conventional construction and is so arranged that when air under pressure is delivered to the chamber on one side of the diaphragm, the valve 25 will be closed. Thus when compressed air is being delivered through the conduit 7 to the receiver 1, compressed air is also being delivered through the connection 26 to the diaphragm valve 25. The valve 25 is thereby closed to prevent delivery of compressed air to the receiver 2 so long as compressed air is being delivered to receiver 1 to effect discharge of the latter.

Assuming that air is being delivered through the conduit 7 to the receiver 1 and also through the connection 26 to the valve 25 to close the latter, that condition will be maintained until the level of sewage in receiver 1 is lowered and valve 15 is adjusted to actuate piston valve 9 so as to stop the flow of compressed air to the receiver 1. When that happens, the conduit 7 is connected to the atmosphere through the exhaust 13 and air pressure in the connection 26 and diaphragm chamber of the valve 25 also released so that compressed air may flow through the conduit 12 to the valve 10, which then will determine whether or not air will be permitted to flow into the receiver 2.

In the event that compressed air is being delivered to receiver 2, and receiver 1 becomes filled with sewage to such an extent that the valves 15 and 9 are actuated to start the delivery of air to receiver No. 1, it will be seen that the supply of air to receiver 2 will be cut off by closing of the valve 25. This condition will then continue until discharging of the receiver 1 is completed, whereupon discharging of the receiver 2 will be resumed. During such an interval in which receiver 2 is inoperative, sewage will not be permitted to enter receiver 2, due to the fact that the conduit 8 is closed by the piston valve 10 from the exhaust line 14. This, however, is not objectionable inasmuch as it ordinarily takes but a matter of around 30 seconds to discharge the other receiver, whereupon resumption of the discharge of the first receiver is effected. During that short period in which sewage may not enter either of the receivers, it will be collected, usually in a catch basin or even permitted to back up in the piping leading to the receivers. It will be understood that ordinarily the receivers are disposed at a considerably lower level than the remainder of the sewer system, so that there is considerable extent of piping in which sewage may collect for the indicated short interval without creating any sort of hazard. However, even that situation may be overcome, if desired, by providing suitable bypass connecting, in the described arrangement, the conduit 8 with the exhaust 14, such by-pass being controlled by a diaphragm valve which would be opened by air pressure emanating from the conduit 7. For practical purposes such a pneumatically controlled by-pass is not, however, required.

In some instances it may be preferable to substitute for the diaphragm valve 25, a solenoid or other electrically or otherwise controlled valve which may in turn be controlled by a pressure controlled electrical switch or other pressure actuated means.

Other changes may be made in the described arrangement without departing from the spirit of the invention, the scope of which is set forth in the appended claims.

I claim:

1. In apparatus of the class described, a pair of sewage receivers, means connected to said receivers for delivering sewage thereto, outlet conduits extending from said receivers, separate conduits for supplying air under pressure to said receivers to thereby effect discharge of sewage therefrom, valve means in each of said conduits controlled by the liquid level in the respective receivers, said valve means being operative to control the passage of air through said conduits into the respective receivers, and a normally open air pressure actuated valve in one of said air supply conduits and connected to the other of said air supply conduits so as to be closed by compressed air from said other conduit when air is admitted thereinto by said liquid level controlled valve.

2. In apparatus of the class described, a pair of sewage receivers, means connected to said receivers for delivering sewage thereto, outlet conduits extending from said receivers, separate conduits for supplying air under pressure to said receivers to thereby effect discharge of sewage therefrom, valve means in each of said conduits controlled by the liquid level in the respective receivers, said valve means being operative to control the passage of air through said conduits into the respective receivers, and a normally open air pressure actuated valve in one of said air supply conduits ahead of the liquid level controlled valve therein, said air pressure actuated valve being connected to the other air supply conduit intermediate the liquid level controlled valve therein and the receiver to which said other conduit leads, whereby said air pressure actuated valve is adapted to be closed by compressed air from said other conduit when air is admitted thereinto by its liquid level controlled valve.

3. In apparatus of the class described, a pair of sewage receivers, means connected to said receivers for delivering sewage thereto, outlet conduits extending from said receivers, separate conduits for supplying air under pressure to said receivers to thereby effect discharge of sewage therefrom, valve means in each of said conduits controlled by the liquid level in the respective receivers for controlling the passage of air through said conduits into the respective receivers, a normally open auxiliary valve in one of said air supply conduits and means for closing said auxiliary valve when the liquid level controlled valve in the other conduit is opened.

EMIL J. CIABATTARI.